United States Patent [19]

Narita et al.

[11] Patent Number: 4,729,606
[45] Date of Patent: Mar. 8, 1988

[54] APPARATUS FOR MOUNTING A WHEEL CAP

[75] Inventors: Yasuhide Narita, Nagoya; Noboru Shirai, Gamagori; Masami Hosono, Nagoya, all of Japan

[73] Assignee: Kabushiki Kaisha Tokai Rika Denki Seisakusho, Aichi, Japan

[21] Appl. No.: 50,256

[22] Filed: May 14, 1987

Related U.S. Application Data

[63] Continuation of Ser. No. 764,298, Aug. 9, 1985, abandoned.

[30] Foreign Application Priority Data

Aug. 10, 1984 [JP] Japan .................... 59-123309[U]
Jun. 18, 1985 [JP] Japan .................... 60-92583[U]

[51] Int. Cl.⁴ ........................................... F16B 13/06
[52] U.S. Cl. ................................. 301/37 S; 24/297; 403/408.1; 411/50; 411/60
[58] Field of Search ........................... 411/55, 49–53, 411/60, 44, 57, 908; 24/297, 292; 301/37 R, 37 SC, 37 S, 108 S, 108 SC; 403/405.1, 408.1

[56] References Cited

U.S. PATENT DOCUMENTS

| | | | |
|---|---|---|---|
| 1,000,715 | 8/1911 | Caywood | 411/60 |
| 1,288,177 | 12/1918 | Pleister | 411/60 |
| 2,616,328 | 11/1952 | Kingsmore | 411/60 |
| 3,549,204 | 12/1970 | Spisak | 301/108 S X |
| 3,996,835 | 12/1976 | Chromy | 411/60 |
| 4,077,300 | 3/1978 | Yoda | 411/15 |
| 4,259,890 | 4/1981 | Walsh | 411/55 X |
| 4,263,833 | 4/1981 | Loudin et al. | 411/60 X |
| 4,391,559 | 7/1983 | Mizusawa | 411/60 X |
| 4,478,545 | 10/1984 | Mizusawa | 411/60 X |

FOREIGN PATENT DOCUMENTS

| | | | |
|---|---|---|---|
| 213614 | 2/1961 | Austria | 411/55 |
| 855914 | 11/1970 | Canada | 411/15 |
| 2751233 | 5/1979 | Fed. Rep. of Germany | 403/408.1 |
| 2905801 | 8/1979 | Fed. Rep. of Germany | 403/405.1 |
| 1269986 | 7/1961 | France | 411/72 |
| 29565 | 3/1977 | Japan | 411/908 |
| 207316 | 9/1966 | Sweden | 411/71 |
| 355278 | 8/1961 | Switzerland | 411/55 |
| 2111587 | 7/1983 | United Kingdom | 403/408.1 |

Primary Examiner—Lloyd A. Gall
Attorney, Agent, or Firm—Price, Gess, & Ubell

[57] ABSTRACT

A wheel cap mounting apparatus for mounting a wheel cap on a disk wheel includes a retainer to be fixedly mounted on the disk wheel, and a bolt for holding the wheel cap to the retainer. The retainer includes a body portion having a throughhole and a nut embedded in the body portion by molding. The threaded hole in the nut aligns with the throughhole in the body portion. A small-diametered insert section is connected to the body portion and adapted to be inserted into an opening formed in the disk wheel. The small-diametered insert section has a hole formed therethrough, which is in alignment with the throughhole formed in the body portion. The retainer further has claws formed integrally with the small-diametered insert section such that the claws project radially outwardly from the small-diametered insert section. By the use of the retainer the wheel cap is rigidly mounted on the disk wheel such that the insert section of the retainer is inserted through the opening formed in the disk wheel with the claws being held in engagement with the peripheral edge of the opening, while the bolt screwed into the nut has its shank being located adjacent the claws to prevent the insert section from being pulled out from the opening.

16 Claims, 10 Drawing Figures

APPARATUS FOR MOUNTING A WHEEL CAP

This is a continuation of application Ser. No. 764,298, filed on Aug. 9, 1985, now abandoned.

BACKGROUND OF THE INVENTION

1. Field of the invention

The present invention relates to an apparatus for mounting a wheel cap made of resin on the disk section of the disk wheel, and more particularly, to an apparatus for mounting the resin wheel cap including a resin half cap, on the disk wheel using a resin retainer.

2. Description of the Prior Art

According to the prior art, such as shown in FIG. 1, a wheel cap made of resin is mounted on a disk wheel in such a manner that a resin claw 2 formed on the resin wheel cap is fitted into a groove 1b formed in the outer wall of a flange 1a provided at the center of the disk wheel. Thus, the wheel cap is fixedly attached to the disk wheel.

According to another example of prior art, as shown in FIG. 2, a wheel cap 2' is fixed to a disk wheel 1' in such a manner that a screw hole 1c' is formed in the disk wheel 1' and the wheel cap 2' is tightened to the disk wheel 1' with a bolt 3 screwed into the screw hole 1c'.

In the case of the apparatus shown in FIG. 1, a resin claw 2a creeps thermally due to heat from the disk wheel to reduce the force of the claw 2a applied to a groove 1b in the disk wheel so that there is a possibility that the heavy half cap or wheel cap will come off, while the use of a high heat resistant material for the retainer to overcome the above defect will result in a high manufacturing cost. Furthermore, the resin claw flexes every time when the disk wheel is mounted or dismounted so that it deteriorates and wears to shorten the durability of the wheel cap. Whereas in the case of the apparatus shown in FIG. 2, a problem arises in that it is necessary to form a screw-hole at the portion where the wheel cap is bolted so that no high degree of productivity can be expected.

SUMMARY OF THE INVENTION

The present invention has been made to overcome the above-mentioned difficulties and its object is to provide an apparatus for mounting a wheel cap, made of resin, on a disk wheel securely, in such a manner that the wheel cap does not deteriorate, nor wears out.

It is also an essential object of the present invention to provide an apparatus for mounting a wheel cap of the above described type which can readily be manufactured at low cost.

In accomplishing these and other objects, a wheel cap mounting apparatus for mounting a wheel cap on a disk wheel comprises a retainer to be fixedly mounted on the disk wheel, and a bolt for holding the wheel cap to the retainer. The retainer comprises a body portion having a throughhole and a nut embedded in the body portion by moulding. The threaded hole in the nut aligns with the throughhole in the body portion. A small-diametered insert section is connected to the body portion and adapted to be inserted into an opening formed in the disk wheel. The small-diametered insert section has a channel formed therethrough, which is in alignment with the throughhole formed in the body portion. The retainer further has claws formed integrally with the small-diametered insert section such that the claws project radially outwardly from the small-diametered insert section. By the use of the retainer the wheel cap is rigidly mounted on said disk wheel such that the insert section of the retainer is inserted through the opening formed in said disk wheel with the claws being held in engagement with the peripheral edge of the opening, while the bolt screwed into the nut has its shank being located adjacent the claws to prevent the insert section from being pulled out from said opening.

According to the present invention, the metallic nut is inserted into a suitable portion of a retainer having a throughhole along the axis thereof. The small-diametered insert section which is inserted into a support hole drilled in the disk surface of the disk wheel is formed at the intermediate portion of the retainer, and the engaging claw extending outwardly from the insert section is formed integral with the retainer. When the insert section of the retainer is inserted through the support hole, the claw is held in engagement with the peripheral edge of the support hole. In this manner, the body portion of the retainer is held projecting from the surface of the disk wheel. After that, the bolt, passing through the wheel cap, is screwed into the nut to fix the wheel cap to the retainer and to push, or thrust, the claw against the disk wheel whereby the retainer is firmly fixed to the wheel cap. Thus, since the resin claw is fixed to the disk wheel through the action of the bolt, the wheel cap does not come off due to thermal deformation. Accordingly, it is possible to provide a resin wheel cap mounting apparatus which solves the above described problems.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

The present invention will now be described in detail by way of example with reference to the accompanying drawings.

Figure 3:
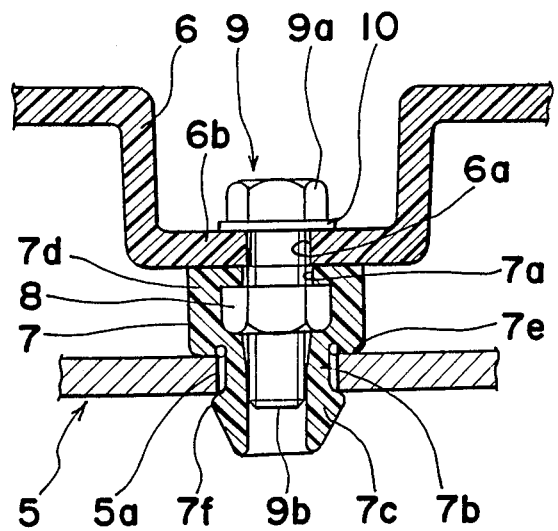
FIG. 3 is a vertical sectional view of a preferred embodiment of a wheel cap mounting apparatus according to the present invention.
Figure 4:
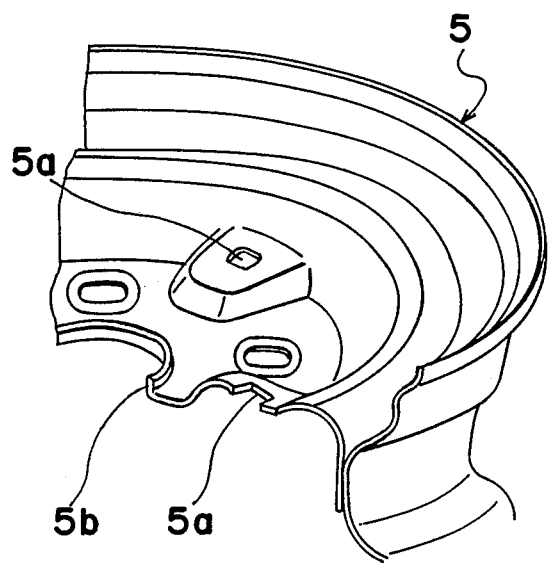
FIG. 4 is a perspective view of a part of a wheel cap used in association with the apparatus according to the present invention.

Referring to FIGS. 3 and 4, a reference number 5 designates a disk wheel, 6 designates a wheel cap made of a resin, 7 designates a retainer mounted in disk wheel 5, 8 designates a metallic nut embedded in retainer 7 by molding, 9 designates a bolt screwed into the nut 8 to fix the wheel cap 6 to the retainer 7.

As shown in FIG. 4, disk wheel 5 has a flange 5b formed at the center thereof and is provided with a plurality of square support holes 5a located at the outer peripheral portion of the flange with a predetermined distance spaced from each other so as to fit the wheel cap on the disk wheel therethrough.

Figure 1:
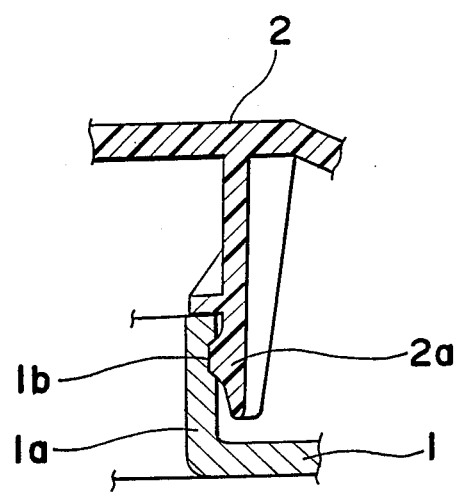
FIGS. 1 and 2 are vertical sectional views, respectively, of conventional apparatus.
Figure 2:
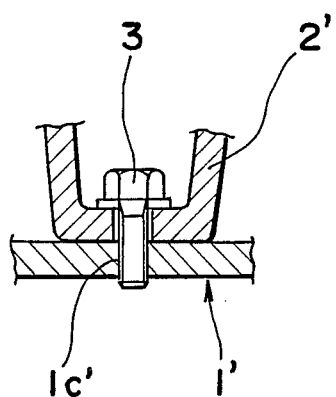

Wheel cap 6 made of resin is the same as that of the conventional one shown in FIG. 2, and is provided with a plurality of bolt holes 6a, each located in the bottom wall of a concave section thereof. As will be apparent from the description below, bolt holes 6a are provided for the attachment of wheel cap 6 to disk wheel 5.

Retainer 7, made of a heat resistant resin, is formed with a throughhole 7a having an inner diameter sufficiently large for receiving the shank 9b of the bolt 9.

A body portion, or an upper half portion 7d of the retainer has a large outer diameter. A metallic nut 8 is inserted, during the step of molding the retainer, in the center of the upper half portion 7d. Nut 8 is provided for receiving bolt 9. At a bottom of the upper half portion 7d, a disk wheel thrusting section 7e extends downwardly along the outer peripheral surface of the upper half portion 7d.

A lower half portion extends downwardly from the upper half portion and is defined by a small-diametered insert section 7b which is located in the hole 5a. The insert section 7b has a length which is equal to the thickness of the disk wheel 5. Provided below the small-diametered insert section 7b is a claw 7c. The claw 7c has a sidewardly projecting edge 7f and the portion below that edge 7f is tapered downward.

The thickness of insert section 7b is thinner than the claw 7c and, therefore, it has some flexibility. Furthermore, insert section 7b may be formed with slits in the axial direction so as to improve its flexibility.

According to the present invention, wheel cap 6 is mounted on disk wheel 5 in the following manner.

First, the mounting of retainer 7 on the disk wheel 5 is described. Claw 7c of the retainer 7 is inserted, with the application of pressure, into the support hole 5a of the disk wheel. In this case, since the outer diameter of the claw 7c is greater than the inner diameter of the support hole 5a, the claw 7c bends inwardly. Then, when projecting edge 7f moves past the support hole 5a, the disk wheel thrusting section 7e comes into pressure contact with the upper surface of the disk wheel 5 and, at the same time, claw 7c extends downwardly through the support hole 5a and expands outwardly to locate edge 7f in an engaged condition with the peripheral edge of support hole 5a. In this manner, retainer 7 is fixedly attached to disk wheel 5 with upper half portion 7d projecting upwardly from the disk surface of the disk wheel.

Next, the mounting of wheel cap 6 to retainer 7 will be described. Wheel cap 6 is held so as to align hole 6a of wheel cap 6 with throughhole 7a of retainer. Then, bolt 9 is inserted, using a washer 10, into the bolt mounting hole 6a in the wheel cap 6 and then screwed into the nut 8, thereby fixedly connecting wheel cap 6 to retainer 7. At the same time, a lower portion of shank 9b of bolt 9 which has passed through nut 8 pushes claw 7c outward, so as to press edge 7f of retainer 7 against the inner wall of hole 5a of disk wheel 5. Therefore, unless the bolt 9 is removed, claw 7c can not change its position and, thus, retainer 7 can not be pulled out from hole 5a. Thus, wheel cap 6 is fixedly mounted on disk wheel 5 through retainer 7.

Replacement of wheel cap 6 can be done by merely unscrewing bolts 9, removing the old wheel cap 6, placing a new wheel cap 6, and screwing bolts 9. In these steps, retainer 7 is maintained on disk wheel 5.

Figure 5:
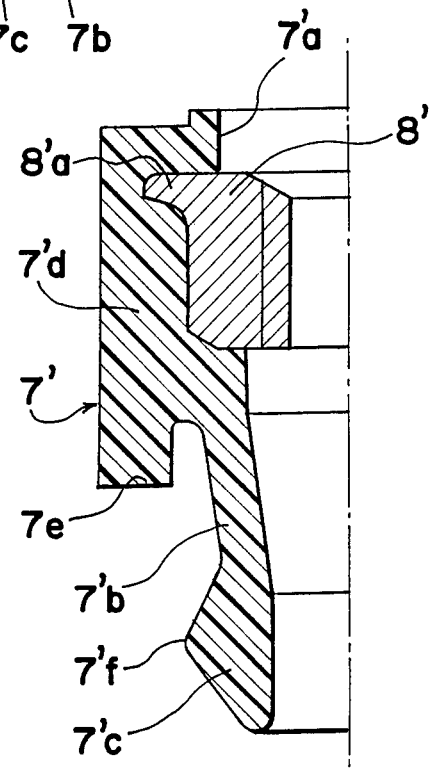
FIG. 5 is a partial vertical sectional view of a modification of the retainer shown in FIG. 3.

The present invention is not limited to the above-described embodiment but various modifications may be adapted, such as shown in FIG. 5. In FIG. 5, a metallic nut 8' having an upper flange 8'a is embedded in retainer 7'. Also, instead of a metallic nut, it is possible to provide a nut made of resin. In such a case, the nut made of resin can be integrally formed with body portion 7'd.

Furthermore, it is to be noted that although the structure of only a single retainer is described herein, a plurality of retainers of the described structure are used in one wheel in the actual practice.

As will be clear from the above description, the resin wheel cap mounting apparatus according to the present invention has the following meritorious effects and advantages:

(1) Since the attachment and removal of wheel cap 6 to and from disk wheel 5 are performed through retainer 7 using bolt 9 and nut 8, and since claw 7c of the retainer is held in the engaged condition to the disk wheel by the insertion of shank 9b of bolt 9 in a space defined between opposite claw portions, a rigid connection between wheel cap 6 and disk wheel 5 can be accomplished, even after the exchange of the wheel cap for a number of times. Also, if the retainer has to be pulled out each time the wheel cap is to be exchanged, the retainer, especially the claw thereof deteriorates and wears out. But, according to the present invention, since the retainer stays on the disk wheel, such deterioration and wear out can be avoided.

(2) Since the claw of the retainer is fixedly connected to the wheel cap by tightening the bolt, the wheel cap does not come off unless the retainer fractures.

(3) Each of the support holes drilled in the disk wheel according to the conventional method can be utilized for receiving the retainer. Therefore, it is not necessary to apply a special process to the disk wheel for making it ready to receive the retainer.

(4) Since the retainer is not formed integrally with the wheel cap, the pitch difference between the support holes in the disk wheel and the holes in the wheel cap can be absorbed by the retainer. Therefore, the wheel cap can be positioned with a high accuracy.

(5) Since the retainer is formed separately from the wheel cap, the retainer itself can be molded with an expensive heat resistant resin material capable of withstanding the heat discharged from the disk wheel, whereas the wheel cap itself can be molded with a less expensive resin material having a comparatively low heat resistant property, such as ABS resins, thereby reducing the manufacturing cost. Furthermore, since the wheel cap according to the present invention includes no claw required to be molded by a slide type die, it is possible to reduce the mold manufacturing cost. Since the opening 5a has a non-circular shape (square in this embodiment) and the small-diametered insert section is also formed into an angular cylinder, it becomes possible to prevent free rotation of the retainer at the time of tightening of the bolt.

In the case of the first embodiment, the claws are maintained in the engaged condition with respect to the inner peripheral edge of the hole formed in the disk wheel by the pushing force of shank 9b of the inserted bolt. However, this embodiment has had such problems that when the bolt is not sufficiently long, the claws of the retainer will not be pushed outwardly. Furthermore, when dust enters the tapped hole of the nut in the retainer or the hole rusts, the bolt can not be screwed into the nut. If one tries to screw the bolt forcibly, the torque on the bolt acts on the retainer itself, resulting in the rotation of the retainer in the retainer mounting hole in the disk wheel. When this happens, the bolt can not be screwed in any more.

The above problems are solved in a second embodiment which will now be described hereinbelow.

Figure 6:
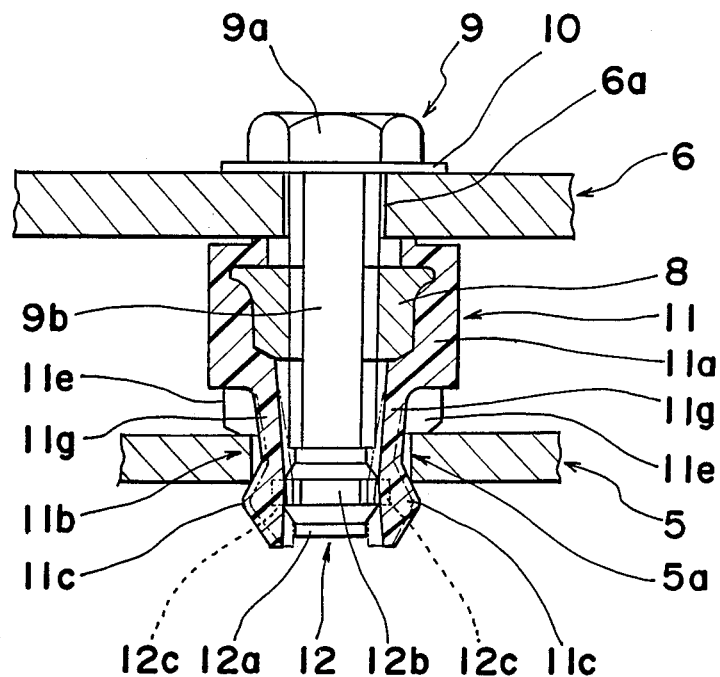
FIG. 6 is a vertical sectional view of a resin wheel cap mounting apparatus according to a second embodiment of the present invention.

Referring to FIG. 6, the wheel cap mounting apparatus according to the second embodiment is additionally provided with a leg expanding member 12 which operates such that when the bolt 9 is screwed into the retainer 11, the leg expanding member is pushed down toward the end of the retainer to expand claws 11c of a split type leg 11b outwardly so that the retainer 11 is held stationary within the mounting hole 5a in the disk wheel 5.

Figure 7:
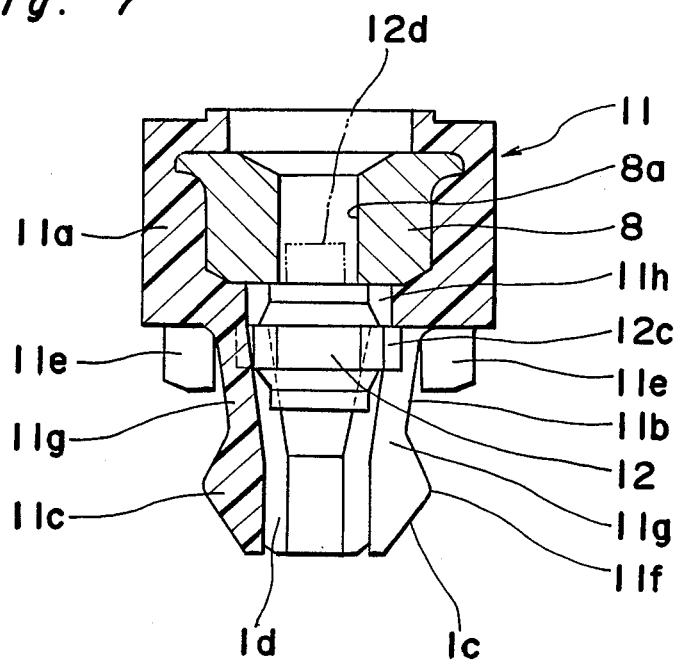
FIG. 7 is a vertical sectional view of a retainer according to the second embodiment of the present invention.
Figure 8:
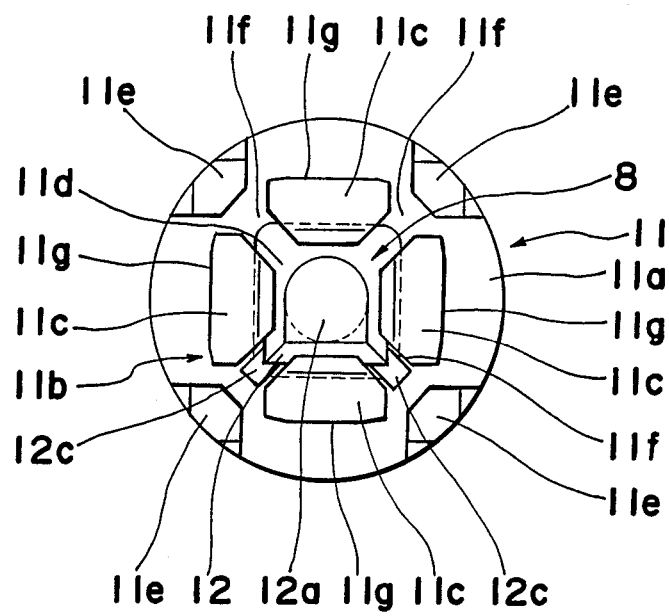
FIG. 8 is a bottom view of the retainer shown in FIG. 6.
Figure 9:
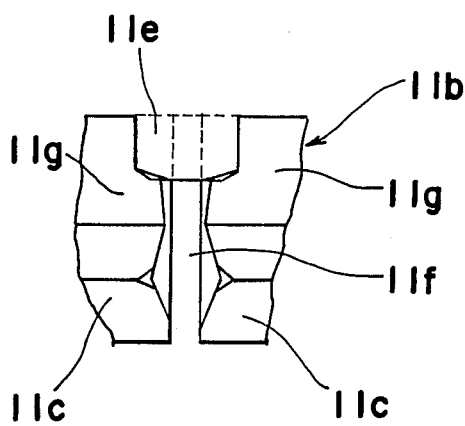
FIG. 9 is an enlarged side view of an essential portion of a slit formed in the retainer shown in FIG. 8.

As shown in FIGS. 7 and 8, retainer 11 is cylindrical and has an upper half portion 11a in which nut 8 is embedded and a lower half portion defined by a split type leg 11b formed integral with the upper half portion 11a. Each leg has a claw 11c formed at its end remote from the upper half portion 11a.

Furthermore, as same as the first embodiment, upper half portion 11a of retainer 11 has an outer diameter larger than the inner diameter of the retainer mounting hole 5a in the disk wheel. In addition, leg 11b of retainer 11 has a cross-sectional shape of a partial square having a width smaller than the outer diameter of upper half portion 11a so that it fits in the square retainer mounting hole 5a. As shown in FIG. 8, legs 11b are separated by a plurality of slits 11f formed at the corners thereof. The slits are somewhat widening toward the end of the leg. Due to the provision of these slits, each of four legs 11g has its own flexibility. At the end of each leg 11g conical claw 11c is provided, which projects outwardly when the leg 11g is inserted completely through retainer mounting hole 5a. At this condition claw 11c engages the inner peripheral edge of hole 5a, thereby holding the retainer 11 stationary within the hole 5a. Outside of the slits 11f, there is arranged a disk wheel thrusting section 11e which comes into pressure contact with the upper surface of the disk wheel 5 when the retainer is mounted on the disk wheel. Section 11e is defined by a projection extending downwardly from the upper half portion 11a of retainer 11. Thus, retainer 11 is inserted into the disk wheel mounting hole 5a, the peripheral portion of disk wheel mounting hole 5a is clamped by claw 11c and thrusting section 11e.

Figure 10:
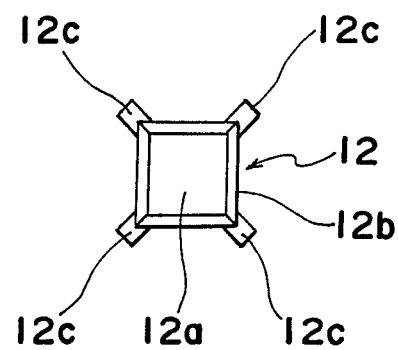
FIG. 10 is a plan view of a leg expanding member used in the retainer shown in FIG. 6.

As shown in FIGS. 6, 7 and 10, leg expanding member 12 is defined by a solid square plate body 12b and a pair of pyramid frustums or mounts 12a integrally mounted on opposite surfaces of square plate body 12b. Each of four sides of square body 12b is longer than the inner diameter of a hole 11d defined by claws 11c and is provided with a projection 12c at each of corners thereof.

These projections 12c fit into the slits 11f of the retainer 11, respectively. In the case where bolt 9 is not yet screwed, even for the first time, into retainer 11, leg expanding member 12 is located close to nut 8, as shown in FIG. 7, such that pyramid frustum 12a mounted on the upper side of the square body 12b is located in a space 11h. The positioning of leg expanding member 12 in such a manner as mentioned above is done by holding projections 12c in slits 11d between legs 11g.

Then, when bolt 9 is screwed into nut 8, leg expansion member 12 moves downward in the axial direction. During the movement, projections 12c are guided along slits 11f, and, as a result, the side surface of member 12 pushes claws 11c to expand outward.

The apparatus for mounting a wheel cap according to the second embodiment operates in the following manner. At first, retainer 11 of the condition shown in FIG. 7 is forcibly inserted into square retainer mounting hole 5a of the disk wheel 5 by bending the leg pieces 11g toward each other. Then, when claws 11c move past the through hole 5a, leg pieces 11g separate to their original condition due to the resiliency. Thus, the peripheral edge of hole 5a is sandwiched between the disk wheel thrusting sections 11e and claws 11c so that retainer 11 is held non-rotataby in the square hole 5a.

Then, bolt 9 is screwed into nut 8 in retainer 11 through bolt hole 6a of wheel cap 6 whereupon leg expanding member 12 located near nut 8 moves downwardly by the pushing force exerted by the tip of bolt 9. During the downward movement, projections 12c of member 12 are guided along the slits 11f, respectively. Thus, when the member 12 moves into space 11d enclosed by claws 11c, as shown in FIG. 6, leg pieces 11g, as well as claws 11c, are forced to expand outwardly to come into pressure contact with the peripheral edge of hole 5a and disk wheel thrusting sections 11e come into pressure contact with the upper face of the peripheral edge of hole 5a so that the peripheral edge of the hole 5a is sandwiched between claws 11c and disk wheel thrusting sections 11e, as shown in FIG. 6. Thus, retainer 11 is held non-rotatably and unremovably within hole 5a. It is to be noted that even after the removal of bolt 9, leg thrusting member 12 continues to be held in the position shown in FIG. 6 due to the elastic force of the leg pieces.

Therefore, according to the wheel cap mounting apparatus of the second embodiment, leg pieces 11g are expanded outwardly by the leg expanding member 12, even if the bolt 9 is removed from the nut 8 in the retainer 11. Thus, retainer 11 stays in the hole 5a non-rotatably and rigidly. Accordingly, even when bolt 9 may not be easily screwed into nut 8 due to the dust on the threaded hole 8a of the nut or the rusting of the hole, retainer 11 itself never rotates with respect to the hole 5a against the torque acting on bolt 9. Thus, it is possible to screw bolt 9 into nut 8 by the application of a stronger screwing torque. Further, since leg pieces 11g are expanded by leg expanding member 12, it is possible to employ a bolt 9 having a relatively short shank 9b, thereby reducing the number of turns of the bolt 9 to a considerably degree as compared to the first embodiment in which leg pieces 11g are expanded directly by the end portion of bolt 9. Furthermore, since projections 12c of leg expanding member 12 are guided within and along slits 11f, a smooth movement of member 12 may be accomplished.

It is to be noted that, other than the above-described embodiments, further different embodiments are possible. For example, leg 11b and retainer mounting hole 5a may be in the form of a triangle, a pentagon or any other desired polygon. Similarly, leg expanding member 12 may be in the form of any desired polygon instead of a square. Furthermore, as shown by a chain line in FIG.

7, leg expanding member 12 may be provided with a projection 12d which projects into nut 8 under the condition shown in FIG. 7, so as to further reduce the number of turns of bolt 9, and at the same time, thereby enabling the leg expanding member 12 to be more quickly positioned in the space 11d that is enclosed by claws 11c. In addition, it is also possible to remove thrusting section 11e, thereby making the peripheral edge of retainer mounting hole 5a to be sandwiched directly between the main body 11a of the retainer and claws 11c of leg 11b.

According to the second embodiment of the present invention, it is possible to prevent the retainer itself from being rotated in the mounting hole of the disk wheel against the torque acting on the bolt even when the bolt can not be easily screwed into the threaded hole of the nut in the retainer due to the dust in the retainer or the rusting of the hole. In such a case in which rust or dust is in the nut, the bolt may be forcibly screwed into the nut by the application of stronger torque. Furthermore, since the leg of the retainer is designed to be expanded by the leg expanding member, it is possible to reduce the number of turns of the bolt to a considerable degree, resulting in shortening the working hours required for mounting the wheel cap on the disk wheel.

Although the present invention has been fully described with reference to several preferred embodiments, many modifications and variations thereof will now be apparent to those skilled in the art, and the scope of the present invention is therefore to be limited not by the details of the preferred embodiments described above, but only the terms of the appended claims.

What is claimed is:

1. A wheel cap mounting apparatus for mounting a wheel cap on a disk wheel having a non-circular shaped opening formed therein, said wheel cap mounting apparatus comprising:
    a retainer to be mounted on said disk wheel,
    said retainer comprising:
        a body portion having a throughhole, a first edge and a second edge at opposite ends of the body portion, said second edge being substantially parallel to said first edge said first edge adapted for being held in contact with said wheel cap, and said second edge adapted for being in contact with said disk wheel, whereby said body portion serves as a spacer between said wheel cap and disk wheel;
        a nut means provided in said body portion between said first and second edges such that a threaded hole in said nut means aligns with said throughhole in said body portion, the nut means being formed separately from the body portion and insert molded with the body portion;
        a small-diametered insert section formed integrally with said body portion and adapted to be inserted into said opening in said disk wheel, said small-diametered insert section being formed with a non-circular sided cross-section and having a channel formed therethrough, said channel being aligned with said throughhole formed in said body portion; and
        claw means formed integrally with said small-diametered insert section such that said claw means projects radially outwardly from one end of said small-diametered insert section remote from said body portion; and
    a bolt inserted in said retainer through said wheel cap, whereby said wheel cap is rigidly mounted on said disk wheel such that said insert section of the retainer is inserted through said opening formed in said disk wheel with said claw means being held in engagement with the peripheral edge of said opening, while said bolt screwed into said nut means has its shank being located adjacent said claw means to prevent said insert section from being pulled out from said opening.

2. A retainer as claimed in claim 1, wherein said small-diameter insert section is defined by a plurality of legs extending from said body portion and extending substantially parallel to each other.

3. A retainer as claimed in claim 1, wherein said nut means is formed by a metallic nut embedded in said body portion by the step of molding.

4. A retainer as claimed in claim 1, wherein said small-diametered insert section is partially rectangular in cross-section.

5. A retainer as claimed in claim 1, further comprising a leg expanding member provided movably in an axial direction in said channel formed in said small-diametered insert section, and the opening in the disk wheel being rectangular-shaped.

6. A retainer as claimed in claim 1, further comprising a leg expanding member provided movably in an axial direction in said channel formed in said small-diametered insert section.

7. A retainer as claimed in claim 6, wherein said leg expanding member comprises a plate portion and a pair of mounts provided on opposite faces of said plate portion.

8. A wheel cap mounting apparatus for mounting a wheel cap on a disk wheel having a non-circular shaped opening formed in said disk wheel, said wheel cap mounting apparatus comprising:
    a retainer to be mounted on said disk wheel, said retainer comprising:
        a body portion having a throughhole and a first edge adapted for being held in contact with said wheel cap, the body portion being further configured to maintain the wheel cap and the disk wheel in a spaced apart relationship;
        a thrusting section ncluding a second edge substantially parallel to said first edge fixed on a side of the body portion opposite the first edge, the thrusting section capable of contacting a peripheral edge of the opening of the disk wheel;
        a nut means provided in said body portion between said first edge and said thrusting section such that a threaded hole in said nut means aligns with said throughhole in said body portion;
        a small-diametered insert section formed integrally with said body portion and adapted to be inserted into said opening in said disk wheel, said small-diametered insert section being formed with a non-circular sided cross-section and having a channel formed therethrough, said channel being aligned with said throughhole formed in said body portion, the small-diametered insert section comprising a plurality of flexible legs;
        claw means formed integrally with said small-diametered insert section such that said claw means projects radially outwardly from one end of said small-diametered insert section remote from said body portion; and
        a leg expanding member provided movably in an axial direction in said channel formed in said small-diametered insert section, the leg expanding member comprising a plate body, a pair of mounts on the plate body, and a plurality of projections on the plate body that extend between the legs; and a bolt inserted in said retainer through said wheel cap, whereby said wheel cap is rigidly mounted on said disk wheel such that said insert section of the retainer is inserted through said opening formed in said disk wheel with said claw means being held in engagement with the peripheral edge of said opening, while said leg expanding member, which is pushed down by the insertion of said bolt screwed into said nut means, is located adjacent said claw means to prevent said insert section from being pulled out from said opening and to firmly engage said disk wheel between said thrusting section and said claw means.

9. An improved wheel mounting assembly, comprising:

a bolt;

a body portion configured to receive the bolt, the body portion having a planar surface to contact a wheel cap, an outer surface, and a thrusting section projecting from the outer surface, the thrusting section having an angulated surface to contact a peripheral edge of a mounting hole of a disk wheel, the angulated surface having a planar section disposed substantially parallel to the planar surface;

a nut means for operatively engaging the bolt with the body portion, the nut means being embedded in the body portion and having an upper flange that interfaces the planar surface of the body portion;

a small-diametered insert section formed integrally with and fixed coaxial to the body portion, the small-diametered insert section defining a channel that extends coaxial with the body portion and having a non-circular cross-section, the small diametered insert section further having an exterior surface that tapers from the body portion and comprises a plurality of spaced apart legs, the spaces between the legs defining a plurality of slits;

a claw means formed integrally with and at the ends of the legs, the claw means having an angular shaped projecting edge that operatively interfaces the thrusting section and contacts a peripheral edge of the mounting hole; and a leg expanding member moveably disposed within the channel, the leg expanding member having a body plate, a pair of pyramid frustums integrally mounted on opposite surfaces of the body plate, and a plurality of projections fixed to the body plate and adapted for movement within the slits, such movement capable of expanding the legs and claw means into contact with the mounting hole.

10. The wheel mounting assembly of claim 9 wherein the claw means further includes a tapered edge portion adjacent the projecting edge.

11. The wheel mounting assembly of claim 10 wherein the small-diametered insert section has a thickness that is less than a thickness of the claw means.

12. The wheel mounting assembly of claim 11 wherein the small-diametered insert section describes four slits and four legs.

13. The wheel mounting assembly of claim 12 wherein the leg expanding member includes four projections which can be engaged in the slits of the small-diametered insert section.

14. An improved wheel assembly, comprising:

a disk wheel describing at least one support hole;

a wheel cap fixable to the disk wheel, the wheel cap having at least one bolt hole; and a retainer that can be disposed in the support hole and the bolt hole, the retainer including:

a body portion describing a throughhole and having a planar surface that can interface the wheel cap and also having a thrusting section that can interface a portion of the disk wheel about the support hole, the thrusting section being located on a side of the body portion opposite the planar surface and having a planar section that can abut the disk wheel, the planar section being substantially parallel to the planar surface, the body portion being further configured to maintain the disk wheel and the wheel cap in a spaced apart relationship;

a nut means in the body portion and having an upper flange;

a small-diametered insert section integrally formed with the body portion and that defines a channel and can be disposed in the support hole, the small-diametered insert section comprising a plurality of independently flexible legs;

a claw means integrally formed with the small-diametered insert section, the claw means having a tapered edge portion and an angular shaped projecting edge that can operatively interface the planar section of the thrusting section, the projecting edge capable of contacting a peripheral edge of the support hole; and a leg expanding member moveably disposed in between the legs and thereby capable of expanding the claw means.

15. The wheel assembly of claim 14 wherein the support hole is non-circularly shaped.

16. The wheel assembly of claim 15 wherein the small-diametered insert section has a cross-section that is non-circularly shaped.

* * * * *